United States Patent [19]
DeCock

[11] 3,800,148
[45] Mar. 26, 1974

[54] DEVICE FOR SENSING A MOVING SHEET MATERIAL FOR IMPERFECTIONS

[75] Inventor: Etienne Marie DeCock, Hamme, Belgium

[73] Assignee: AGFA-Gevaert N.V., Mortsel, Belgium

[22] Filed: May 19, 1972

[21] Appl. No.: 255,087

[30] Foreign Application Priority Data
May 21, 1971 Great Britain................. 16,348/71

[52] U.S. Cl........................ 250/562, 250/219 WE
[51] Int. Cl. ........................................ G01n 21/30
[58] Field of Search 250/219 FR, 219 WE, 219 DF, 250/214, 208, 209, 206

[56] References Cited
UNITED STATES PATENTS

| | | | |
|---|---|---|---|
| 2,812,447 | 11/1957 | MacMartin | 250/219 DF |
| 3,652,791 | 3/1972 | Shuey | 250/214 R |
| 3,487,222 | 12/1969 | Martens | 250/214 R |
| 3,577,039 | 5/1971 | Sanford | 250/209 |
| 3,534,402 | 10/1970 | Crowell | 250/219 DF |
| 3,448,279 | 6/1969 | Lindemann | 250/219 DF |
| 3,206,606 | 9/1965 | Burgo | 250/219 DF |
| 3,340,400 | 9/1967 | Quittner | 250/219 DF |
| 3,584,963 | 6/1971 | Wisner | 250/219 DF |
| 3,096,443 | 7/1963 | Laycak | 250/219 DF |

Primary Examiner—James W. Lawrence
Assistant Examiner—D. C. Nelms
Attorney, Agent, or Firm—William J. Daniel

[57] ABSTRACT

A device for sensing a moving sheet for imperfections. The device comprises a plurality of light sources and corresponding photocells for receiving the radiation thereof after reflection from or transmission by the sheet. Each photocell has its own pre-amplifier which is provided with automatic gain control means which controls the pre-amplifier in such a way that the average output signal thereof remains equal to a pre-determined value. The device is insensitive to incorrect mounting of the photocells relative to the light sources and insensitive to spreadings in the characteristics of the electric components, and a change from a more specular material being sensed to a more diffuse material does not require a re-adjustment of the device.

6 Claims, 3 Drawing Figures

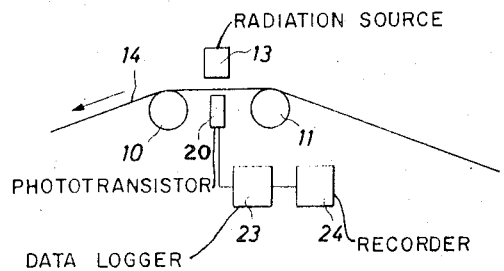
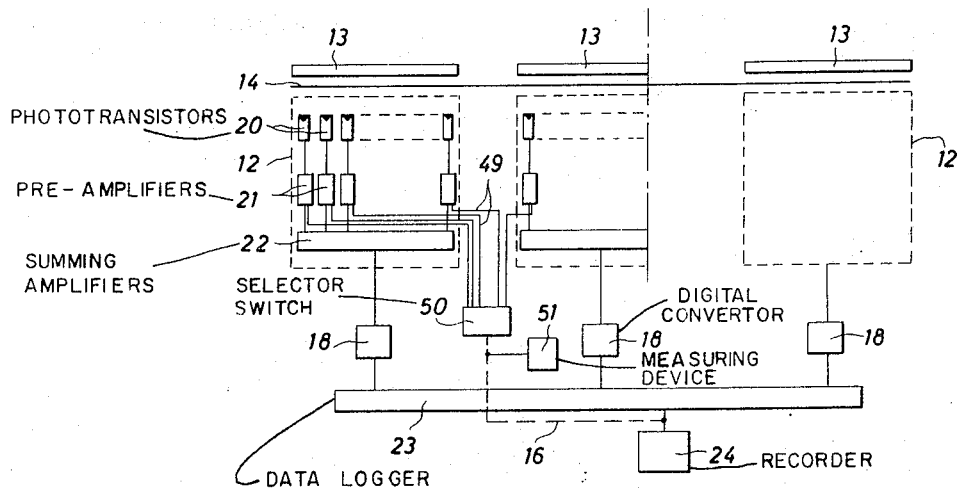
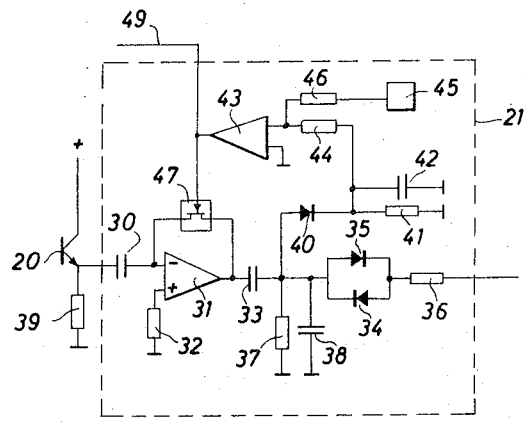

DEVICE FOR SENSING A MOVING SHEET MATERIAL FOR IMPERFECTIONS

This invention relates to a device for sensing a moving sheet material for imperfections, of the type comprising a source for directing electromagnetic energy on one surface of the moving sheet material, and a series of photosensitive sensors for sensing adjacent sectors of the sheet to detect modifications in the energy after reflection from or passage through the said moving sheet material. The output signals of the photosensitive sensors are coupled through an A.C. coupling to distinct pre-amplifiers and the output signals thereof may be clipped, summed, or treated in another way so as to provide the required information about variations in the energy absorption or reflectance of the web. A known device of the described type requires painstaking and repeated adjustments for the following reasons.

The response of all the channels must be equal. By the term "channel" is meant the source or part thereof which produces the electromagnetic energy which is captured by one photoelectric sensor, the lens system or the part thereof which converges the energy of the source on the photoelectric sensor, the occasional filter means, e.g., an infra-red filter, the photoelectric sensor, the pre-amplifier with its feedback resistor circuit, and the low-and high-pass filters in the electric circuit.

The lens system and the occasional filter means show uniform characteristics for each channel, and thus they present no problems.

On the contrary, the electromagnetic energy produced by the source may differ for one of more channels, and this for the following reasons.

The dimensions of the photosensitive sensors are very small, and thereby they may be mounted very close to each other. For instance, a web of a width of 60 cm may be sensed by 240 photosensitive sensors, distributed in 15 groups of 16 sensors each. The sensors in a group are mounted inline, and the different groups themselves are mounted in staggered relationship so that 240 adjacent sectors of the web may be sensed. The lighting of each photosensitive sensor by a separate light-source would be problematic, and therefore tubular sources of electromagnetic energy are used, each source covering one group of photosensitive sensors. Owing to the finite length of the energy sources, the temperature of the filament thereof will be highest at the middle and lowest near the extremities of the energy sources so that the outer photosensitive sensors will receive less energy than do the more centrally disposed ones.

The static and the dynamic characteristics of the photosensitive sensors may differ from one specimen to the other. Differences in the static characteristics of a photoelectric cell are without importance since the D.C. component of the measurement signal is yet not transmitted by the A.C. coupling in the circuit. Differences in the dynamic behaviour, however, cause different output signals of the photosensitive sensors in response to equal variations in the electromagnetic energy captured by them.

It is possible to cope with these variations of different parameters by individually adjusting the amplification factor of the different pre-amplifiers. In a most convenient way, this is usually done by adjusting the value of one of the resistors in the negative feedback circuit of the pre-amplifiers, so that the gain is controlled thereby.

Be that as it may, any adjustment must be redone at the moment the device is used for examining another kind of sheet material, and this for the following reasons.

First, the absorption or the reflectance of the other kind of sheet material may differ from that of the first one and the energy received on each photosensitive sensor will differ in consequence. Although the absolute value of the energy received on the sensors is without importance since the D.C. component of the electric output signal is not transmitted in the circuit, the photosensitive sensors will have to work at another point of their radiation energy input versus electric output current curve, and at said other working points the dynamic response of the sensors may differ from the response at the first working point. This different response may be overcome by adjusting the source of electromagnetic energy so that the photosensitive sensors receive about the same quantum of energy as they did for the first, less or more, reflecting or transmitting, sheet material.

The described technique offers no good results since it is shown that the response of the sources of electromagnetic radiation i.e., the electromagnetic energy output versus the electric power input and, in particular, the distrubution of said energy output according to the length of the source, differs from one source to the other.

Second, the transmission, or the reflectance according to the way in which the sheet material is being measured, may be specular for one material and diffuse for another material. This means that the non-uniformity of the electromagnetic energy output of an elongate energy source as described hereinbefore will be less as "seen" by the photosensitive sensors for a diffuse material as compared with a specular material, since said non-uniformity will be flattened out to a given extent by the passage through, or the reflection from, such more diffuse material.

Summarizing, unless each time each channel is individually adjusted, the known device is not capable of sensing imperfections of the same order of magnitude in two different sheet materials, the overall absorption of reflectance of the materials being equal but one material being more specular and the other more diffuse, or the two materials being substantially equally specular or diffuse but the overall absorption or reflectance of the materials being considerably different.

It is the object of the present invention to provide a device for sensing a moving sheet material for imperfections, which is not subject to the adjustments of the kind referred to hereinbefore.

According to the present invention, a device for sensing a moving sheet material for imperfections comprises means for guiding the sheet material along a determined path, a source for directing electromagnetic energy on one surface of a sheet material moved along such path, a plurality of photosensitive sensors for sensing the radiation after reflection from or passage through the said surface, A.C.-coupled pre-amplifiers including a filter, for individually amplifying and filtering the electric output signals of the photosensitive sensors, automatic gain control means for individually controlling the gain of each preamplifier so that the average output signal of each said pre-amplifier remains substantially equal to a pre-determined value, and clipping means which pass output signals of said pre-amplifiers only if such signals are greater than said average output signal.

The expression "average signal" means in the present specification the average value of the input and output signals of the amplifiers determined over a period of time which is great compared with the period of the electric signals which are caused by imperfections which may be sensed by the device according to the invention. A typical value for the time constant which determines the average signal is, for instance, 5 seconds, but it should be understood that this value may be considerably smaller and in the case of very fast running sheets, the time constant may even be 0.1 second. A typical value for the period of the electric signals which are produced by imperfections amounts from 50 to 0.2 msec.

The term "sheet" includes sheets, strips or webs.

The sheet "material" may, e.g., be a material such as photographic film, paper of a synthetic composition.

It is surprising that the use of automatic gain control means in a device for fault retrieval or measurement is acceptable. As a matter of fact, if one uses a plurality of pre-amplifiers which are each individually controlled by automatic gain control means, then one may expect that the gain of such amplifiers will differ and, in consequence, that the order of magnitude of detectable imperfections will differ from one channel to the other. Such differences in the order of magnitude of detectable imperfections do exist, but they are not caused by differences in the gain of the different amplifiers. This is explained hereinafter.

The differences in gain of the pre-amplifier compensate differences in the values and in the characteristics of the components of each channel and differences in the mounting of each sensor relative to the source of radiation, and thus said different gains ensure the equality of the sensitivity of the different channels, rather than destroying such equality.

However, each pre-amplifier is controlled in such a way by the automatic gain control means that the average output signal of each pre-amplifier remains substantially equal to a predetermined value. Said average output signal is determined substantially by the noise, since the noise is continuously present whereas signals which represent detectable imperfections in a sheet only occur sporadically, i.e., discontinuous. It will thus be understood that it is in fact the noise which controls the gain of the different pre-amplifiers, always taking into account differences in components as mentioned already hereinbefore. The clipping means which transmit signals only if they are greater than said average output signal, ensure automatically an optimum signal-to-noise ratio for each channel. If the noise, whatever the cause may be, is greater in one channel than in another one, then the sensitivity of said channel will be automatically less. This is not detrimental to the operation of the device. On the contrary, if the sensitivity of such less good channel were increased to equal the sensitivity of the better channels, then the only result would be that such one channel would continuously be signalling imperfections, such imperfections being only produced by noise which the device is not capable of separating from actual faults. Certain optional but preferred features of the invention are as follows.

A plurality of photosensitive sensors are arranged to detect transmitted or reflective energy from one source of electromagnetic energy and they form with said source one group, a plurality of such groups being provided adjacent to each other in slightly staggered relationship to sense the full width of a sheet.

The device is provided with means for periodically scanning the gain of the different pre-amplifiers in order to become aware of a defect or breakdown in a given channel, which might be automatically compensated by the gain control means.

The circuit which determines the time constant for the average signal is adjustable and the adjustment thereof depends on the speed of the sheet in such a way that the time constant becomes smaller as the speed of the sheet increases.

The device according to the invention may be used in sensing for imperfections in the structures of a sheet but it may also, and perferably will be, used for the examination of one or more layers which have been applied to and are in adherent contact with such sheet.

The device according to the invention is described hereinafter by way of example with reference to the accompanying figures wherein:

FIG. 1 is a diagrammatic side elevation of a device according to the present invention.

FIG. 2 is a circuit diagram of different sensing groups, and

FIG. 3 is the electric circuit of one pre-amplifier.

The device shown in FIG. 1 comprises two rotatable sheet guide rollers 10 and 11 mounted in parallel, and spaced sufficiently from each other to accommodate a plurality of sensor groups, such as the group 12 shown. A plurality of sources of electromagnetic energy, such as the source 13, are provided opposite to the sensor groups and the electromagnetic energy emitted by them is received by the corresponding sensor groups after transmission through a web 14 pulled under tension over the rollers 10, and 11. In the present example, the sources of electromagnetic energy are incandescent lamps and the photosensitive sensors are phototransistors, so that the latter terms will be used throughout the further description. The output signal of each sensor group 12 is transmitted to a data logger 23 and a recorder 24.

In addition to the incandescent lamps, the sources 13 comprise further elements such as a mirror, a converging lens, an optical filter for limiting the waveband of the emitted energy, etc. All this is known in the art and therefore no further details are given hereinafter with respect to the construction of the sources 13 of electromagnetic energy.

The circuit of FIG. 2 shows the arrangement of different groups of sensors and of sources according to the transverse direction of a web 14. Each group 12 of sensors comprises a plurality of phototransistors 20 which are mounted in-line and which receive the electromagnetic energy of a tubular incandescent lamp of the corresponding source 13, after transmission through the sheet 14. For the sake of clearness the difficult groups have been drawn separated from each other in the transverse direction of the web, but it will be understood that in practice the phototransistors cover adjacent sectors of the sheet so that the sheet may be fully sensed for imperfections. The output signal of each phototransistor 20 is amplified in a pre-amplifier 21 and the output signals of the pre-amplifiers of one group 12 are summed in a summing amplifier 22. The output of the summing amplifiers 22 is still an analog signal, and this is converted into a digital value by the analog to digital convertors 18 which may be so adjusted that thay produce one pulse for an input signal which exceeds a predetermined value. The output of the analog to digital convertors 18 is connected to a data logger 23 which orders received information in an appropriate way, and which may comprise a typewriter for printing out the fault pattern of the sheets. Alternatively, the imperfections of the sheet may be recorded by a recorder 24 on a paper or magnetic tape which advances at a speed which is in proportion to the speed of the sheet.

A selector switch 50 has a plurality of inputs which are connected each over a lead 49 to one pre-amplifier 21. In the mentioned way the operation of the different pre-amplifiers may be scanned and indicated by a measuring device 51, or, alternatively, be recorded by the recorder 24.

A pre-amplifier 21 is described in detail hereinafter with reference to FIG. 3. The output voltage of the phototransistor 20 is coupled over a capacitor 30 to the inverting input of an operational amplifier 31. The noninverting input of the amplifier is grounded over a resistor 32. The output signal of the operational amplifier is coupled over a capacitor 33 to two diodes 34, 35 which are connected in anti-parallel and which form a clipping circuit which transmits output voltages to a resistor 36 only if these are greater than a given value. The resistor 36 is further connected to the input of the summing amplifier 22, shown in FIG. 2.

The frequency response of the pre-amplifier depends, among others, on resistor 39 in the emitter circuit of the phototransistor and on capacitors 30, 33 and 38 and resistor 37 of the pre-amplifier. The mentioned components determine filters which limit the frequency band of the pre-amplifier and thereby improve the signal-to-noise ratio of the circuit.

The output signal of the operational amplifier is detected by a detector circuit comprising the diode 40, the resistor 41 and the capacitor 42. The detected signal is applied to a control amplifier 43 over a resistor 44, whereas a reference signal of opposite polarity which may be set at a circuit 45 is fed over a resistor 46 to the same input terminal of the control amplifier.

The voltage difference produced by the capacitor circuit 44, 46 is amplified by the control amplifier 43 which controls an element 47, the resistive impedance of which varies in accordance with the output voltage of the control amplifier 43. The terminals of the element 47 are connected to the inverting input and the output of the operational amplifier 31, so that the impedance of element 47 determines the feedback, and consequently the gain, of the pre-amplifier.

Typical values for the described circuit are as follows.

The phototransistor is a type MRD 200 silicon photoelement, (manufactured by Motorola Cy. — Arizona — U.S.A.).

The 3 db point of the high-pass filter is at 50 Hz, and thus the time constant of said filter is 20 msec.

The 3 db point of the low-pass filter is at 10 kHz.

The clipping diodes are two silicon diodes.

The detector diode is a germanium diode.

The time constant of the detector circuit, and thus of the average output signal, is 5 seconds.

The source 45 for the reference voltage is set to produce an average output voltage of 400 mV for the pre-amplifier.

The variable feedback impedance 47 is a field effect transistor. The operation of the device is as follows.

The sheet being examined showing no imprefections, the AC output signal of the amplifier 31 amounts to 400 mV. Said voltage is determined by setting the device 45 since any difference between the set voltage and the detected voltage at the entry of the control amplifier 43 is amplified to control the gain of the pre-amplifier in such a way that an AC output voltage of 400 mV is obtained, whatever the magnitude of the noise signal at the input of the pre-amplifier may be.

The following operational steps occur when an imperfection of the sheet passes over a phototransistor 20. A pulse-like electric signal is generated which extends above the noise level and which thus appears at the output of the pre-amplifier as an A.C. signal greater than 400 mV. Such signal is greater than the barrier potential of the clipping diodes 34, 35 and thereby it is transmitted over resistor 36 to the summing amplifier 22. The fault signal just described is not detected by the detector circuit since the period of such signal is necessarily considerably smaller than the time constant of the detector because of the high pass filter (resistors 39 and 37, and capacitors 30 and 33) in the pre-amplifier circuit. Thus, the adjustment of the gain of the pre-amplifier is not affected by the instant appearance of an output signal which differs from the average output signal. If adjacent sectors of the sheet show imperfections at the same time then the pre-amplifiers of the corresponding channels will produce output signals which will be added to the signal produced by the first pre-amplifier.

Dependent on its adjustment the corresponding ADC convertor 18 will pass generate an imperfection signalling pulse. This pulse may thus be caused by a fault signal of one channel only, which is considerably greater than 400 mV, but it may also be caused by less great fault signals, say 600 mV which, however, occur simultaneously in two or more channels of one group. The output pulses of the ADC convertors 18 are treated by the data logger 23 which, for instance, may store the signals indicating imperfections in the sheet for a certain time and then start to produce, e.g., by typewriting, a table summarizing the different imperfections. As an alternative, said signals may also be continuously recorded by a recorder as indicated by numeral 24.

In the operation of the device, the automatic gain control means compensate differences in amplification which may be due to differences in the values of components, to deviations in the mounting of the phototransistors relative to the light sources, etc.

This means that in case a breakdown or a considerable change in one or more electrical components occurs, the gain controlling means may even compensate the effect of such defect. An operation under such circumstances is not desired since sooner or later the defective channel may fall out fully.

It is, therefore, desired to check whether each channel operates within acceptable limits and this may be done in a simple way by measuring the output voltages of the different gain controlling amplifiers 43 over leads 49. A selector switch 50 permits a measuring device 51, e.g., an electronic voltmeter with high input impedance, to be connected in succession to the different leads 49. The mentioned examination preferably occurs periodically. Considering the extremely reliable operation of the device which will include integrated circuits, matched phototransistors, etc., the periods of such examination may extend from one hour to several days. Occasionally, the signal which represents the gain of the difference pre-amplifiers may be recorded by the recorder 24, as shown by the lead 16 in broken lines.

The following data illustrate the operation of the device of the present invention for one specific photographic material.

Sheet : a radiographic film, e.g., industrial X-ray film, on a triacetate base of a thickness of 0.2 mm, and a width of 40 cm, being coated at either side with a light-sensitive silver halide emulsion layer containing about 15 g $AgNO_3$ per square meter.

Transport speed : 50 m per minute.

Spectral range of the radiation : 0.8 to 1 nm

Groups of photo-sensitive sensors : 10.

Number of phototransistors per group : 16.

Size of detectable imperfections : minimum : 40 $\mu$m; maximum (according to the longitudinal direction of the web) : 10 cm The invention is not limited to the described embodiment.

The sensing of a sheet for inperfection may also occur by reflection, rather than by transmission as described. The photosensitive sensors may also be coupled individually to a data logger or to other read-out devices, rather than in groups.

The photosensitive sensors may be provided in one group which covers only part of the width of the sheet, and which is arranged to scan the width of the sheet. The circuit 50 which permits to set a reference value may be provided only once, rather than for each pre-amplifier, and controls in that way all the pre-amplifiers.

The electric circuit may be provided with additional circuits which permit to make a distinction between smaller and larger imperfections, to produce a particular signal in case imperfections are sensed in different sectors pointing to a defect extending over a considerable part of the width of the web, to produce a signal in the case there is a uniform defect according to the length of the sheet, e.g. an area which has not been coated, since the electric signal which represents such defect is a DC current which the circuit as described in the example is not capable of transmitting, etc. We refer to the Belgian Patent Specification 768,212 filed June 8, 1971 by Gevaert-Agfa N.V. wherein more details with respect to a device for the sensing of defects of the kind just described have been given, and which device may be used in conjunction with a device according to the present invention.

We claim:

1. A device for sensing a moving sheet material for imperfections comprising:
   a. means for guiding a sheet material along a determined path,
   b. a source for impinging electromagnetic energy on one surface of a sheet material moved along such path,
   c. a plurality of photosensitive sensors sensing the energy after modulation by said material at a plurality of distinct areas thereof and providing corresponding output signals,
   d. A.C.-coupled pre-amplifiers including a filter for individually amplifying and filtering the electric output signals of the photosensitive sensors,
   e. automatic gain control means for individually controlling the gain of each pre-amplifier so that the average output signal of each said pre-amplifier is substantially equal to a predetermined value, and
   f. clipping means which pass output signals of the pre-amplifiers only if such signals are greater than said average output signal.

2. A device according to claim 1 wherein the automatic gain control means comprises a detector circuit with a rectifier and a smoothing circuit for the rectified signal, a reference circuit for producing a reference signal, a comparator for comparing the rectified and smoothed signal with the reference signal so as to determine a deviation signal, a gain controlling amplifier which is controlled by said deviation signal, and a variable impedance which may be varied in response to the output signal of said gain controlling amplifier.

3. A device according to claim 2, wherein said variable impedance is a field effect transistor.

4. A device according to claim 1, wherein the time constant of the gain control means is at least 10 times greater than the time constant of the filters of said pre-amplifiers.

5. A device according to claim 1, wherein the time constant of the gain control means is greater than 0.1 seconds.

6. A device according to claim 1, wherein means is provided for scanning the gain of the different pre-amplifiers.

* * * * *